US008983307B2

(12) United States Patent
Byun et al.

(10) Patent No.: US 8,983,307 B2
(45) Date of Patent: Mar. 17, 2015

(54) OPTICAL TRANSMITTER AND OPTICAL COMMUNICATION SYSTEM USING RESONANCE MODULATOR THAT IS THERMALLY COUPLED

(71) Applicant: Samsung Electronics Co., Ltd., Suwon-si, Gyeonggi-do (KR)

(72) Inventors: Hyun-Il Byun, Seongnam-si (KR); Dong-Jae Shin, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 248 days.

(21) Appl. No.: 13/734,447

(22) Filed: Jan. 4, 2013

(65) Prior Publication Data
US 2013/0195463 A1     Aug. 1, 2013

(30) Foreign Application Priority Data
Jan. 26, 2012   (KR) .................... 10-2012-0007796

(51) Int. Cl.
*H04B 10/54*   (2013.01)
*H04B 10/572*  (2013.01)
*H04J 14/02*   (2006.01)
*H04B 10/50*   (2013.01)

(52) U.S. Cl.
CPC ............ *H04B 10/572* (2013.01); *H04J 14/02* (2013.01); *H04J 14/0221* (2013.01); *H04B 10/506* (2013.01)
USPC .......................................... 398/201; 398/186

(58) Field of Classification Search
CPC .. H04B 10/501; H04B 10/506; H04B 10/572; H04B 10/54

USPC ................................................... 398/186, 203
See application file for complete search history.

(56) References Cited

U.S. PATENT DOCUMENTS 7,362,927 B1 * 4/2008 Ilchenko et al. .............. 385/15
2005/0238366 A1 * 10/2005 Kawanishi et al. .......... 398/183
(Continued)

FOREIGN PATENT DOCUMENTS

KR  10-2004-0007759    1/2004
KR  10-2004-0078924    9/2004
(Continued)

OTHER PUBLICATIONS

English Abstract for Publication No. 10-2004-0007759.
(Continued)

*Primary Examiner* — Leslie Pascal
(74) *Attorney, Agent, or Firm* — F. Chau & Associates, LLC

(57) ABSTRACT

An optical transmitter for an optical communication system includes a light source that outputs optical signals having a plurality of wavelengths, and a wavelength control unit. The wavelength control unit receives an optical signal from the light source, resonates an optical signal having a first wavelength, modulates the optical signal of the first wavelength with a first transmission data signal to obtain an intensity modulated optical signal, and outputs the intensity modulated optical signal. The wavelength control unit may be integrally formed on a semiconductor substrate in which a high thermal conductivity material is used. Alternatively, a trench that intercepts external heat may be formed in a boundary surface of the wavelength control unit, and may be filled with a low thermal conductivity material.

20 Claims, 9 Drawing Sheets

(56) References Cited

U.S. PATENT DOCUMENTS

| | | |
|---|---|---|
| 2006/0018583 A1 | 1/2006 | Iannelli |
| 2010/0181937 A1 | 7/2010 | Nogami et al. |
| 2013/0148983 A1* | 6/2013 | Robinson et al. ............. 398/187 |
| 2014/0205289 A1* | 7/2014 | Meade et al. ................... 398/48 |

FOREIGN PATENT DOCUMENTS

| | | |
|---|---|---|
| KR | 10-2005-0045649 | 5/2005 |
| KR | 10-2007-0074900 | 7/2007 |
| KR | 10-2008-0101065 | 11/2008 |
| KR | 10-2009-0061100 | 6/2009 |

OTHER PUBLICATIONS

English Abstract for Publication No. 10-2004-0078924.
English Abstract for Publication No. 10-2005-0045649.
English Abstract for Publication No. 10-2007-0074900.
English Abstract for Publication No. 10-2008-0101065.
English Abstract for Publication No. 10-2009-0061100.

* cited by examiner

OPTICAL TRANSMITTER AND OPTICAL COMMUNICATION SYSTEM USING RESONANCE MODULATOR THAT IS THERMALLY COUPLED

CROSS-REFERENCE TO RELATED APPLICATIONS

This application claims the benefit of Korean Patent Application No. 10-2012-0007796, filed on Jan. 26, 2012, in the Korean Intellectual Property Office, the contents of which are herein incorporated by reference in their entirety.

BACKGROUND

1. Technical Field

Embodiments of the inventive concept are directed to an optoelectronic integrated circuit, and more particularly, to an optical transmitter and an optical communication system using a resonance modulator that is thermally coupled.

2. Discussion of the Related Art

Optical communication systems have been studied and developed to increase the amount of data that may be transmitted. An optical communication system uses an optical transmitter for transmitting information through an optical fiber cable, and has been used primarily for long-distance communication. However, as operating speeds of electronic devices and the amount of transmitted data increase, optical communication systems are being used for short-distance communication, such as board-to-board or chip-to-chip communication.

SUMMARY

Embodiments of the inventive concept provide an optical transmitter and an optical communication system using a resonance modulator that is thermally coupled.

According to an aspect of the inventive concept, there is provided an optical transmitter including: a light source that outputs optical signals having a plurality of wavelengths; and a wavelength control unit that receives an optical signal from the light source, resonates an optical signal of the optical signals having a first wavelength, modulates the optical signal of the first wavelength with a first transmission data signal to obtain an intensity-modulated optical signal, and outputs the intensity-modulated optical signal, wherein the wavelength control unit is integrally formed on a semiconductor substrate in which a high thermal conductivity material is used.

The optical transmitter may include a coupler connected between the light source and the wavelength control unit that stabilizes an optical signal output from the light source to the first wavelength.

The wavelength control unit may include: a first waveguide through which the optical signal received from the coupler is transmitted; a first prototype filter that resonates the optical signal received from the first waveguide to the first wavelength; a second waveguide that transmits the optical signal of the first wavelength received from the first prototype filter to the light source through the coupler; third and fourth waveguides through which the optical signal of the first wavelength received from the first prototype filter is transmitted; and a first modulator that receives an optical signal from the third waveguide and modulates an intensity of the optical signal according to the first transmission data signal.

The wavelength control unit may monitor a power state of the light source by using an optical signal transmitted to the fourth waveguide.

The wavelength control unit may further include a second modulator that receives an optical signal from the third waveguide and modulates a wavelength of the optical signal according to a second transmission data signal.

The optical transmitter may include a circulator connected between the light source and the wavelength control unit that stabilizes an optical signal received from the light source to the first wavelength. The circulator may include a plurality of ports.

The wavelength control unit may include: a first waveguide that transmits an optical signal received at a first port of the circulator from a second port of the circulator; a first prototype filter that resonates an optical signal received from the first waveguide to the first wavelength; a second waveguide that transmits an optical signal of the first wavelength received from the first prototype filter to a third port of the circulator; third and fourth waveguides that transmit an optical signal of the first wavelength received from the first prototype filter; and a first modulator that receives an optical signal transmitted through the third waveguide and modulates a wavelength of the optical signal according to the first transmission data signal. The circulator may transmit from the first port of the circulator to the light source the optical signal received from the third port of the circulator.

The light source may be a distributed feedback laser diode (DFB-LD) or a Fabry Perot laser diode (FP-LD).

The light source may use an amplified spontaneous emission (ASE), and the optical transmitter may include a wavelength demultiplexer connected between the light source and the wavelength control unit that may divide an optical signal received from the light source according to wavelengths.

The wavelength control unit may include: a first waveguide through which an optical signal received from the wavelength demultiplexer is transmitted; a first prototype filter that resonates an optical signal received from the first waveguide to the first wavelength and transmits the optical signal to a second waveguide; second and third waveguides through which an optical signal of the first wavelength received from the first prototype filter is transmitted; and a first modulator that receives an optical signal from the second waveguide and modulates an intensity of the optical signal according to the first transmission data signal.

A trench that intercepts external heat transfer may be formed in a boundary surface of the wavelength control unit, and a material having a low thermal conductivity may be filled in the trench.

According to another aspect of the inventive concept, there is provided an optical communication system including: a plurality of optical transmitters that transmit optical data signals having different wavelengths; a wavelength multiplexer that transmits to an optical channel a wavelength-multiplexed optical signal formed from the optical data signals received from each of the plurality of optical transmitters; a wavelength demultiplexer that receives the wavelength-multiplexed optical signal from the optical channel and divides the wavelength-multiplexed optical signal according to wavelengths to obtain wavelength-divided optical signals; and an optical receiver that converts the wavelength-divided optical signals received from the wavelength demultiplexer into electrical data signals, wherein each of the plurality of optical transmitters includes: a light source that outputs optical signals having a plurality of wavelengths; and a wavelength control unit that receives an optical signal from the light source, resonates an optical signal of the optical signals having a first wavelength, modulates the optical signal of the first wavelength with a first transmission data signal to obtain an intensity-modulated optical signal, and outputs the intensity-modulated optical signal, wherein the wavelength control unit is integrally formed on a semiconductor substrate in which a high thermal conductivity material is used.

The wavelength control unit may include a trench that intercepts external heat formed in a boundary surface thereof and filled with a low thermal conductivity material.

According to another aspect of the inventive concept, there is provided an optical transmitter including: a light source that outputs optical signals having a plurality of wavelengths; a wavelength control unit that includes a prototype filter that resonates with a first wavelength to transmit an optical signal having a first wavelength from the optical signals, a first electrode disposed on an outer circumference surface of the prototype filter, a second electrode disposed on an inner circumference surface of the prototype filter, said first and second electrodes adapted to receive a first transmission data signal that modulates an intensity of the optical signal of the first wavelength, wherein the wavelength control unit is integrally formed on a semiconductor substrate; and a trench that intercepts external heat formed in a boundary surface of wavelength control unit that is filled with a low thermal conductivity material.

The optical transmitter may include a coupler connected between the light source and the wavelength control unit that stabilizes an optical signal output from the light source to the first wavelength. The wavelength control unit may include a first waveguide through which the optical signals received from the coupler is transmitted; a second prototype filter that resonates the optical signal of the optical signals to the first wavelength; a second waveguide that transmits the optical signal of the first wavelength from the second prototype filter to the light source through the coupler; and third and fourth waveguides through which the optical signal of the first wavelength received from the first prototype filter is transmitted to the first prototype filter.

The optical transmitter may include a circulator connected between the light source and the wavelength control unit that stabilizes an optical signal received from the light source to the first wavelength, said circulator including a plurality of ports. The wavelength control unit may include a first waveguide that transmits an optical signal received at a first port of the circulator from a second port of the circulator; a second prototype filter that resonates an optical signal received from the first waveguide to the first wavelength; a second waveguide that transmits an optical signal of the first wavelength received from the second prototype filter to a third port of the circulator; and third and fourth waveguides that transmit an optical signal of the first wavelength received from the second prototype filter to the first prototype filter. The circulator may transmit from the first port of the circulator to the light source the optical signal received from the third port of the circular.

The light source may use amplified spontaneous emission (ASE), and the optical transmitter further comprises a wavelength demultiplexer connected between the light source and the wavelength control unit that divides an optical signal received from the light source according to wavelengths. The wavelength control unit may include a first waveguide through which an optical signal received from the wavelength demultiplexer is transmitted; a second prototype filter that resonates an optical signal received from the first waveguide to the first wavelength and transmits the optical signal to a second waveguide; and second and third waveguides through which an optical signal of the first wavelength received from the second prototype filter is transmitted to the first prototype filter.

The wavelength control unit may include a second prototype filter that resonates an optical signal received from the light sources to the first wavelength; a second waveguide that transmits the optical signal of the first wavelength received from the second prototype filter to the first prototype filter; a third wave guide that receives the optical signal of the first wavelength from the second prototype filter; and a modulator that receives the optical signal from the third waveguide and modulates a wavelength of the optical signal according to a second transmission data signal.

DETAILED DESCRIPTION OF EXEMPLARY EMBODIMENTS

Figure 1:
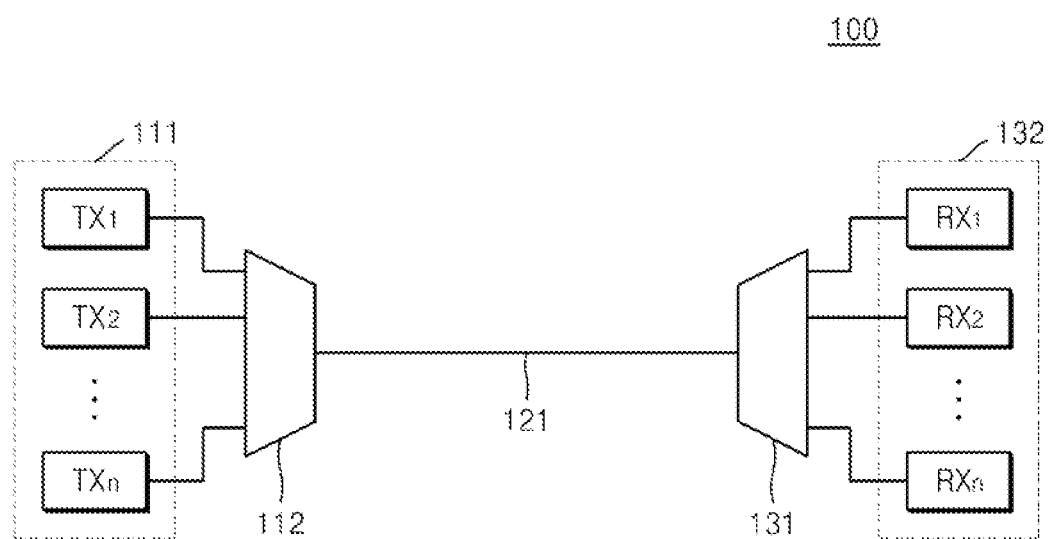
FIG. 1 is a block diagram illustrating an optical communication system including an optical transmitter, according to an embodiment of the inventive concept.

Embodiments of the inventive concept will now be described more fully with reference to the accompanying drawings, in which exemplary embodiments of the inventive concept are shown. However, this is not intended to limit embodiments of the inventive concept to particular modes of practice, and it is to be appreciated that all changes, equivalents, and substitutes that do not depart from the spirit and technical scope of the inventive concept are encompassed in the inventive concept. Like reference numerals denote like elements in the drawings.

A large-capacity optical communication network may use wavelength-division multiplexing (WDM) in which a plurality of wavelengths are multiplexed and transmitted from a transmitter and then split apart at a receiver.

FIG. 1 is a block diagram illustrating an optical communication system 100 including an optical transmitter 111, according to an embodiment of the inventive concept.

Referring to FIG. 1, the optical communication system 100 includes the optical transmitter 111, a wavelength multiplexer 112, an optical channel 121, a wavelength demultiplexer 131, and an optical receiver 132.

The optical transmitter 111 may use as a light source a distributed feedback laser diode (DFB-LD) or a Fabry Perot laser diode (FP-LD), which is a multi-wavelength light source. Alternatively, the optical transmitter 111 may use amplified spontaneous emission (ASE) as a light source. The optical transmitter 111 may include a plurality of channels. Each of the channels may receive an optical signal having a desired wavelength λ and modulate the optical signal according to a transmission data signal.

The wavelength multiplexer 112 may pass therethrough optical signals having different wavelengths $\lambda_1, \ldots,$ and $\lambda_n$ transmitted from the optical transmitter 111. The wavelength multiplexer 112 may use an arrayed waveguide grating (AWG). The wavelength multiplexer 112 may distribute the optical signals to the arrayed waveguides of the AWG. The AWG may be a waveguide circuit fabricated by depositing quartz-based glass or silicon on a substrate formed of silicon or the like. The optical signals propagating through the wavelength multiplexer 112 may be transmitted through the optical channel 121.

The optical channel 121 may transmit the optical signals by using an integrated planar waveguide, an optical waveguide, or an optical fiber. In wavelength-division multiplexing (WDM), optical signals may effectively use the wide band capacity provided by an optical fiber. WDM transmitted signals may have greater bandwidth than time-division multiplexing (TDM) transmitted signals because WDM transmits signals according to the number of divided wavelengths.

The optical channel 121 may reduce interaction between channels by reducing a walk-off length by using an optical fiber having a large dispersion. The optical channel 121 may reduce a nonlinearity coefficient by using an optical fiber having a large effective core area. Also, the optical channel 121 may reduce nonlinear effects of the light intensity by setting the intensity of light transmitted to the optical fiber to a lowermost value in an allowable range.

The wavelength demultiplexer 131 may receive an optical signal formed using WDM and transmitted through the optical channel 121 and divide the optical signal according to its wavelengths. The wavelength demultiplexer 131 may use an AWG. The optical signal propagating through the wavelength demultiplexer 131 may be transmitted to the optical receiver 132. The optical receiver 132 may convert the optical signal into an electrical signal that is original transmitted data.

Figure 2:
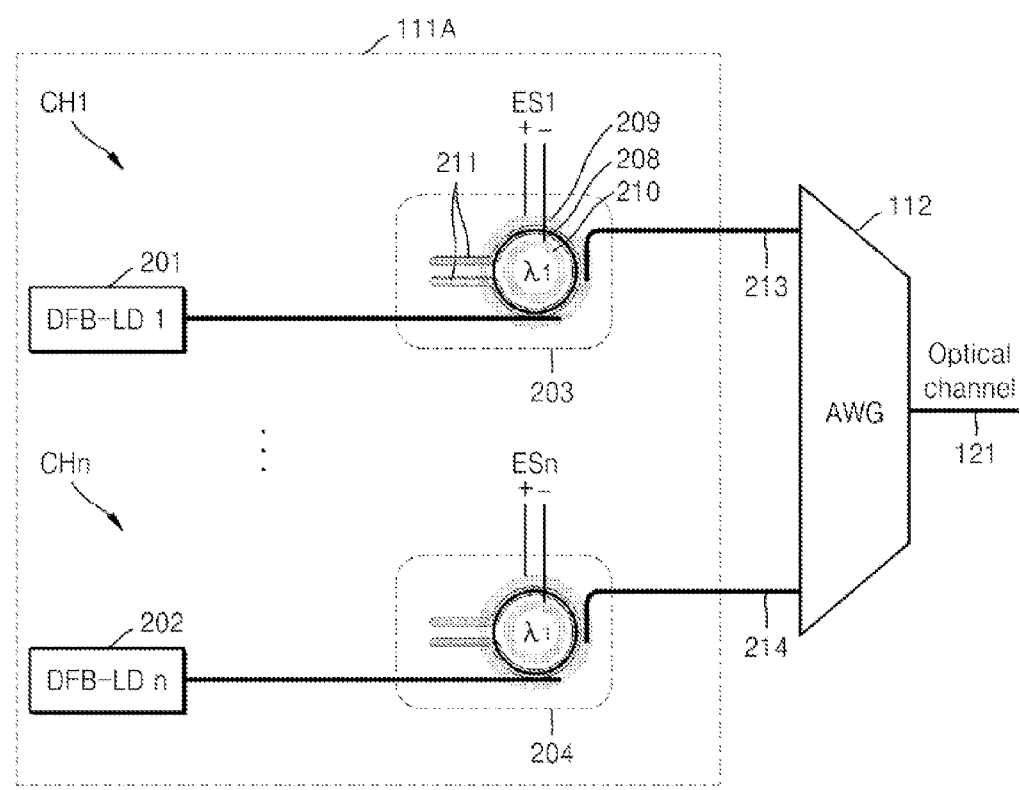
FIG. 2 is a block diagram illustrating an optical transmitter according to an embodiment of the inventive concept.

FIG. 2 is a block diagram illustrating an optical transmitter 111A according to an embodiment of the inventive concept.

Referring to FIG. 2, the optical transmitter 111A may transmit optical signals output from a plurality of channels CH1, . . . , and CHn to the wavelength multiplexer 112 through waveguides 213 and 214. The optical transmitter 111A may respectively transmit optical signals having different wavelengths $\lambda_1, \ldots,$ and $\lambda_n$ through the channels CH1, . . . , and CHn. The optical transmitter 111A may include a plurality of light sources 201 and 202 and wavelength control units 203 and 204. The wavelength control units 203 and 204 may be called modulators 203 and 204. The optical transmitter 111A may be connected to the optical channel 121 through the wavelength multiplexer 112 using an AWG.

The first channel CH1 may include the light source 201 and the modulator 203. A DFB-LD may be used as the light source 201. A DFB-LD is a multi-wavelength light source having a very narrow frequency line width, but is relatively expensive. Alternatively, an FP-LD may be used as the light source 201.

The modulator 203 may include a prototype filter 208, a first electrode 209, a second electrode 210, and a heater 211. The prototype filter 208 may resonate for an optical signal having a specific wavelength. The prototype filter 208 may have a resonance wavelength of, for example, a first wavelength $\lambda_1$. The prototype filter 208 may output an optical signal having the first wavelength $\lambda_1$ from the light source 201.

The first electrode 209 may be disposed on an outer circumferential surface of the prototype filter 208, and the second electrode 210 may be disposed on an inner circumferential surface of the prototype filter 208. A first transmission data signal ES1 is a binary signal that may be applied to the first electrode 209 and the second electrode 210. For example, if the first transmission data signal ES1 is a logic low signal having a ground voltage level, there is no voltage difference between the first electrode 209 and the second electrode 210. If the first transmission data signal ES1 is a logic high signal having a predetermined voltage level, there is a predetermined voltage difference between the first electrode 209 and the second electrode 210.

An intensity of an optical signal of first wavelength output from the prototype filter 208 may be modulated by to a voltage difference between the first electrode 209 and the second electrode 210 due to the first transmission data signal ES1. When a logic low first transmission data signal ES1 is applied, with no voltage difference between the first and second electrodes 209 and 210, the prototype filter 208 resonates at the first wavelength $\lambda_1$ and maximizes an intensity of an optical signal output from the prototype filter 208. When a logic high first transmission data signal ES1 is applied, with a predetermined voltage difference between the first and second electrodes 209 and 210, the prototype filter 208 resonates at a wavelength shifted from the first wavelength $\lambda_1$ minimizing an intensity of an optical signal output from the prototype filter 208.

An optical signal modulated according to the first transmission data signal ES1 and output from the prototype filter 208 may be transmitted to the wavelength multiplexer 112 through the waveguide 213.

The first wavelength $\lambda_1$, which is a resonance wavelength of the prototype filter 208, can vary due to a temperature change. To maintain the first wavelength $\lambda_1$ of the prototype filter 208 irrespective of temperature, the heater 211 may be disposed over the prototype filter 208. A temperature of the prototype filter 208 may be kept constant by maintaining a constant temperature from the heater 211.

Like the first channel CH1, other channels of the optical transmitter 111A each may include a light source and a modulator. For example, the $n^{th}$ channel CHn may include the light source 202 having a DFB-LD, and the modulator 204 that modulates an optical signal output from the light source 202. A prototype filter in the modulator 204 may have a resonance wavelength of, for example, an $n^{th}$ wavelength $\lambda_n$. The modulator 204 may receive an optical signal of $n^{th}$ wavelength $\lambda_n$ output from the light source 202 and modulate the optical signal of $n^{th}$ wavelength $\lambda_n$ according to an $n^{th}$ transmission data signal ESn. An optical signal modulated according to the $n^{th}$ transmission data signal ESn and output from the modulator 204 may be transmitted to the wavelength multiplexer 112 through the waveguide 214. To maintain the $n^{th}$ wavelength $\lambda_n$, which is a resonance wavelength of the prototype filter 208 in the modulator 204, irrespective of temperature, the modulator 204 may include a heater.

Figure 3:
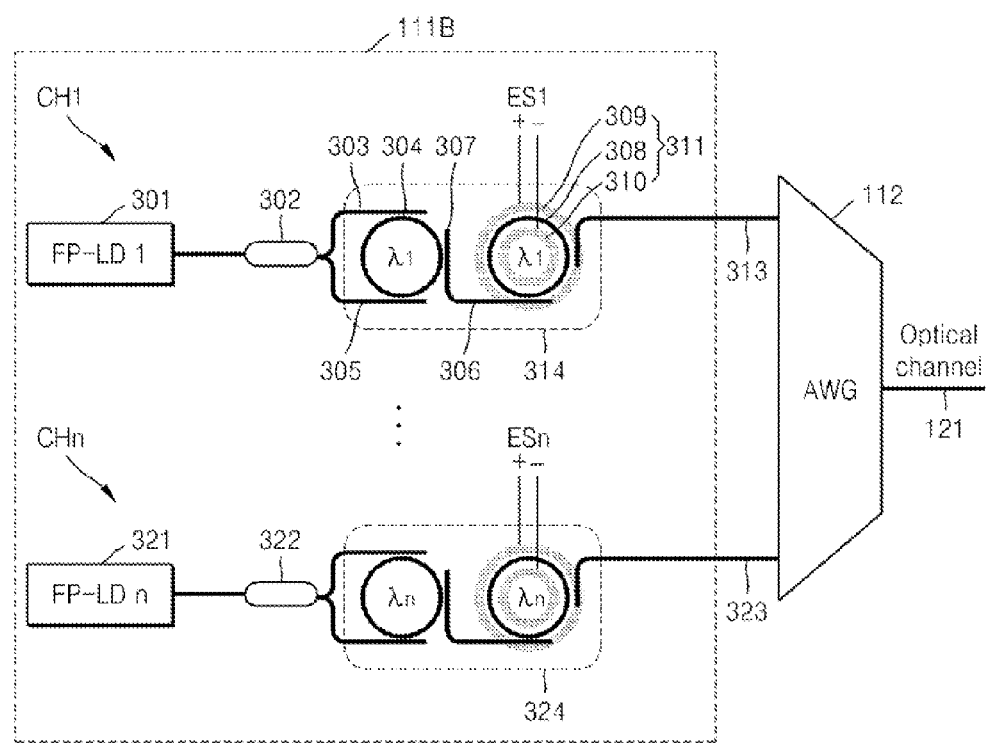
FIG. 3 is a block diagram illustrating an optical transmitter according to another embodiment of the inventive concept.

FIG. 3 is a block diagram illustrating an optical transmitter 111B according to another embodiment of the inventive concept.

Referring to FIG. 3, the optical transmitter 111B may transmit optical signals from the plurality of channels CH1, . . . , and CHn to the wavelength multiplexer 112 through waveguides 313 and 323. The optical transmitter 111B may respectively transmit optical signals having the different wavelengths $\lambda_1, \ldots,$ and $\lambda_n$ to the channels CH1, . . . , and CHn. The optical transmitter 111B may include a plurality of light sources 301 and 321, a plurality of couplers 302 and 322, and a plurality of wavelength control units 314 and 324. The optical transmitter 111B may be connected to the optical channel 121 through the wavelength multiplexer 112 using an AWG.

Figure 4:
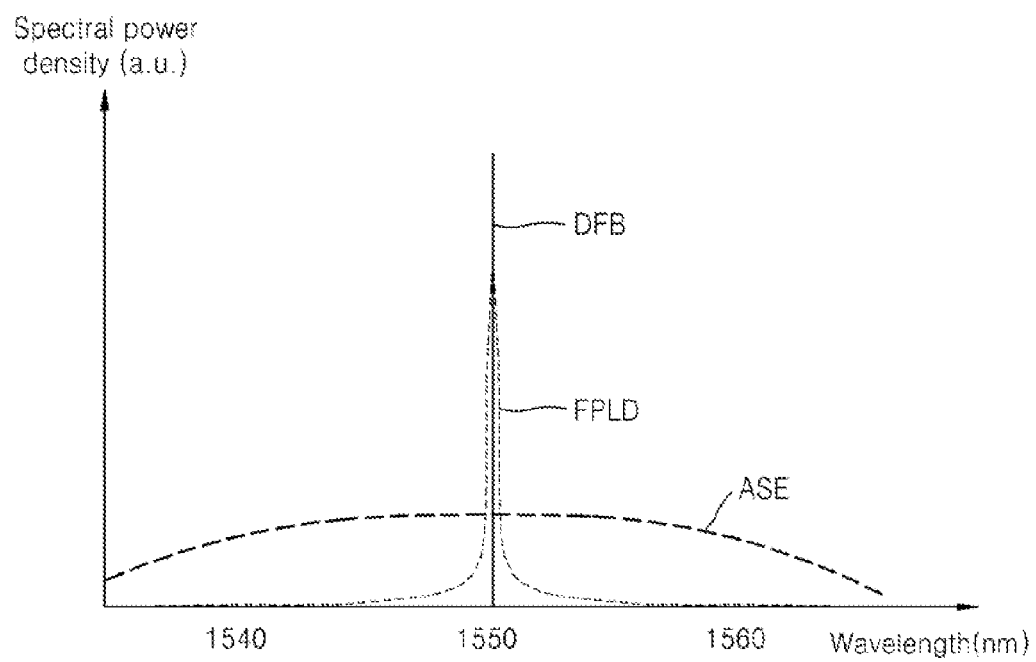
FIG. 4 is a block diagram illustrating an optical transmitter according to another embodiment of the inventive concept.

The first channel CH1 may include the light source 301, the coupler 302, and the wavelength control unit 314. An FP-LD may be used as the light source 301. An FP-LD is relatively inexpensive, and has a narrow frequency line width, as shown in FIG. 4. Alternatively, a DFB-LD may be used as the light source 301.

The coupler 302 may receive and distribute an optical signal output from the light source 301. Also, the coupler 302 may receive and output an optical component of an optical signal that is backscattered or reflected. The coupler 302 may be a bidirectional coupler. An optical signal passing through the coupler 302 may be transmitted to the wavelength control unit 314.

The wavelength control unit 314 may modulate an intensity of an optical signal transmitted through the coupler 302 according to the first transmission data signal ES1. The wavelength control unit 314 may include a first waveguide 303, a first prototype filter 304, a second waveguide 305, a third waveguide 306, a fourth waveguide 307, and a modulator 311.

An optical signal input to the wavelength control unit 314 through the coupler 302 may be transmitted to the first and second waveguides 303 and 305. An optical signal transmitted to the first waveguide 303 may be transmitted to the first prototype filter 304. The first prototype filter 304 may have a resonance wavelength of, for example, the first wavelength $\lambda_1$. An optical component having the first wavelength $\lambda_1$ that matches a resonance curve of the first prototype filter 304 may be output from the first waveguide 303 to the second waveguide 305. An optical signal of first wavelength $\lambda_1$ output to the second waveguide 305 may be transmitted back to the light source 301 through the coupler 302. Through this process, an optical signal output from the light source 301 may be stabilized to the first wavelength $\lambda_1$.

An optical signal transmitted to the second waveguide 305 through the coupler 302 may be transmitted to the first prototype filter 304. An optical component having the first wavelength $\lambda_1$ that matches the resonance curve of the first prototype filter 304 may be output from the second waveguide 305 to the first waveguide 303. An optical signal of first wavelength $\lambda_1$ output to the first waveguide 303 may be transmitted back to the light source 301 through the coupler 302. Through this process, an optical signal output from the light source 301 may be further stabilized to the first wavelength $\lambda_1$.

An optical signal of first wavelength $\lambda_1$ output from the first prototype filter 304 may be transmitted to the third waveguide 306 and the fourth waveguide 307. An optical signal transmitted to the third waveguide 306 may be provided to the modulator 311 to be modulated. The modulator 311 may modulate an intensity of the optical signal according to the first transmission data signal ES1.

An optical signal transmitted to the fourth waveguide 307 may be used to monitor a power state of the light source 301. In detail, when the power of the optical signal transmitted to the fourth waveguide 307 is lower than an upper limit, the power of the light source 301 may be increased, and when the power of the optical signal transmitted to the fourth waveguide 307 is higher than the upper limit, the power of the light source 301 may be reduced. The power of the light source 301 may be monitored without interrupting its transmission.

The modulator 311 may include a second prototype filter 308, a first electrode 309, and a second electrode 310. The second prototype filter 308 may have a resonance wavelength of the first wavelength, like the first prototype filter. 304. The first electrode 309 may be disposed on an outer circumferential surface of the second prototype filter 308, and the second electrode 310 may be disposed on an inner circumferential surface of the second prototype filter 308.

The binary first transmission data signal ES1 may be applied to the first electrode 309 and the second electrode 310. For example, when the first transmission data signal ES1 is a logic low signal having a ground voltage level, there is no voltage difference between the first electrode 309 and the second electrode 310. When the first transmission data signal ES1 is a logic high signal having a predetermined voltage level, there is a predetermined voltage difference between the first electrode 309 and the second electrode 310.

The second prototype filter 308 receives the optical signal transmitted to the third waveguide 306 and outputs an optical component having the first wavelength $\lambda_1$ that matches a resonance curve of the second prototype filter 308. An intensity of an optical signal output from the second prototype filter 308 may be modulated by a voltage difference between the first and second electrodes 309 and 310 due to the first transmission data signal ES1.

When a logic low first transmission data signal ES1 is applied to the first and second electrodes 309 and 310, an intensity of an optical signal output from the second prototype filter 308 is maximized. When a logic high first transmission data signal ES1 is applied to the first and second electrodes 309 and 310, an intensity of an optical signal output from the second prototype filter 308 is minimized.

An optical signal modulated according to the first transmission data signal ES1 and output from the second prototype filter 308 may be transmitted to the wavelength multiplexer 112 through the fifth waveguide 313.

The first and second waveguides 303 and 305, the first prototype filter 304, the third and fourth waveguides 306 and 307, and the modulator 311 may be thermally coupled to one another to have the same temperature. A refractive index of each of the first and second waveguides 303 and 305 and the third and fourth waveguides 306 and 307 may vary due to an ambient temperature change. The first wavelength $\lambda_1$ may vary due to an ambient temperature change.

For an optical signal that is stably resonated to the first wavelength $\lambda_1$ to be input to the modulator 311, the thermally coupled first and second waveguides 303 and 305, the first prototype filter 304, the third and fourth waveguides 306 and 307, and the modulator 311 may be integrally formed as one wavelength control unit 314 on a semiconductor substrate. A material having a high thermal conductivity, such as silicon nitride, may be used in the wavelength control unit 314, or a trench that intercepts external heat may be formed in a boundary surface of the wavelength control unit 314 and be filled with a material having a low thermal conductivity.

Like the first channel CH1, other channels of the optical transmitter 111B may each include a light source, a coupler, and a wavelength control unit. For example, the $n^{th}$ channel CHn may include the light source 321 for which an FP-LD may be used, the coupler 322 that receives and distributes an optical signal output from the light source 321, and the wavelength control unit 324 that modulates an optical signal transmitted through the coupler 322 according to the $n^{th}$ transmission data signal ESn.

Prototype filters in the wavelength control unit 324 may have a resonance wavelength of, for example, the $n^{th}$ wavelength $\lambda_n$. The wavelength control unit 324 may receive an optical signal of $n^{th}$ wavelength $\lambda_n$, output from the light source 321 and modulate the optical signal according to the $n^{th}$ transmission data signal ESn. An optical signal modulated according to the $n^{th}$ transmission data signal ESn and output from the wavelength control unit 324 may be transmitted to the wavelength multiplexer 112 through the sixth waveguide 323.

The wavelength control unit 324 may be integrated onto a semiconductor substrate to provide the same temperature for waveguides and the prototype filters in the wavelength control unit 324. A material having a high thermal conductivity may be used in the wavelength control unit 324, and a trench that intercepts external heat may be formed in a boundary surface of the wavelength control unit 324 and filled with a material having a low thermal conductivity.

Figure 5:
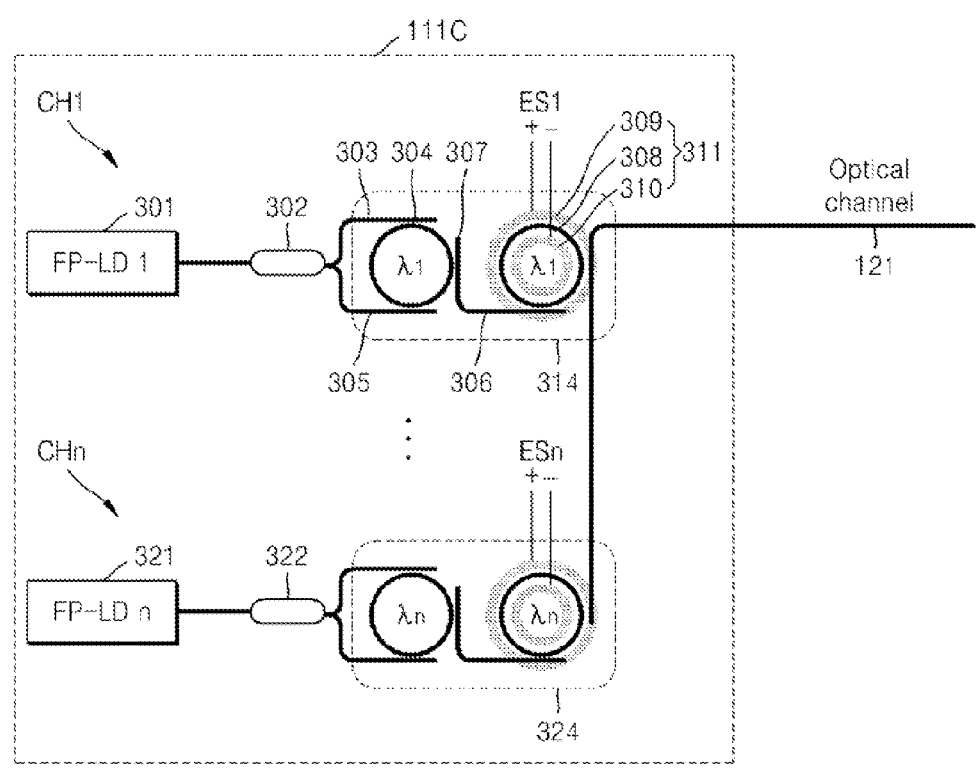
FIG. 5 is a block diagram illustrating an optical transmitter according to another embodiment of the inventive concept.

FIG. 5 is a block diagram illustrating an optical transmitter 111C according to another embodiment of the inventive concept.

Referring to FIG. 5, the optical transmitter 111C is similar to the optical transmitter 111B of FIG. 3, except that optical signals of the channels CH1, . . . , and CHn transmitted to the optical channel 121 through the fifth and sixth waveguides 313 and 323 and the wavelength multiplexer 112 in the optical transmitter 111B of FIG. 3 are directly transmitted to the optical channel 121 in the optical transmitter 111C of FIG. 5. A detailed description of the elements of the optical transmitter 111C that are the same as corresponding elements in FIG. 3 will not be repeated.

In the optical transmitter 111C, an optical signal of first wavelength $\lambda_1$ modulated according to the first transmission data signal ES1 of the first channel CH1 and output from the wavelength control unit 314 may be directly transmitted to the optical channel 121. An optical signal of $n^{th}$ wavelength $\lambda_n$ modulated according to the $n^{th}$ transmission data signal ESn of the $n^{th}$ channel CHn and output from the wavelength control unit 324 may be directly transmitted to the optical channel 121.

The optical channel 121 may act as one optical waveguide that transmits optical signals having the first through $n^{th}$ wavelengths $\lambda_1, \ldots,$ and $\lambda_n$. The optical channel may equalize intensities of the optical signals having the first through $n^{th}$ wavelengths $\lambda_1, \ldots,$ and $\lambda_n$.

Figure 6:
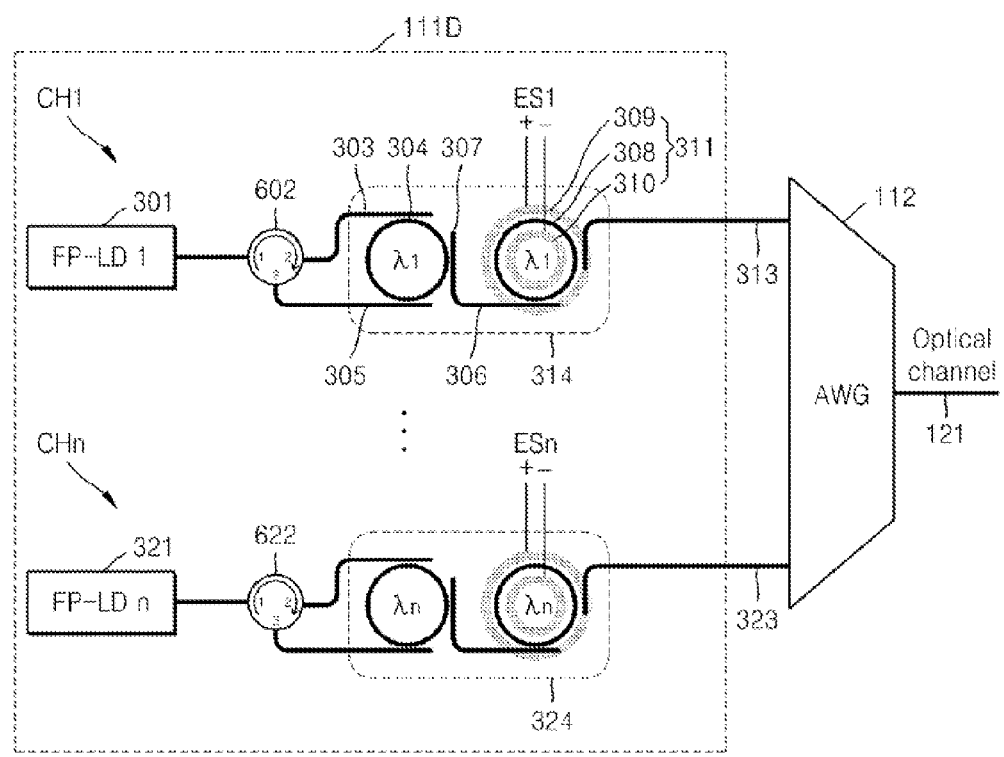
FIG. 6 is a block diagram illustrating an optical transmitter according to another embodiment of the inventive concept.

FIG. 6 is a block diagram illustrating an optical transmitter 111D according to another embodiment of the inventive concept.

Referring to FIG. 6, the optical transmitter 111D is similar to the optical transmitter 111B of FIG. 3, except that to stabilize wavelengths output from the FP-LD light sources 301 and 321, the optical transmitter 111D uses circulators 602 and 622 instead of the couplers 302 and 322 of the optical transmitter 111B of FIG. 3. A detailed explanation of the elements of the optical transmitter 111D that are the same as corresponding elements in FIG. 3 will not be repeated.

In the first channel CH1, an optical signal output from the light source 301 may be transmitted to the circulator 602. The circulator 602 is a passive nonreciprocal device including three or more ports. For example, if the circulator 602 includes three ports, the circulator 602 may be configured such that light input to a first port is output from a second port, light input to the second port is output from a third port, and light input to the third port is output from the first port.

The circulator 602 may operate based on a nonreciprocal phase shift or a Faraday rotation. The circulator 602 may include center electrodes which intersect at a predetermined angle on a ferrite sheet. A static magnetic field may be applied to the ferrite sheet, and a high frequency magnetic field may be generated by the center electrodes using ferromagnetic characteristics of the ferrite sheet. Nonreciprocal characteristics are obtained by rotating a polarization plane of the high frequency magnetic field.

An optical signal output from the light source 301 may be input to the first port of the circulator 602, output from the second port of the circulator 602, and transmitted to the first waveguide 303. An optical signal transmitted to the first waveguide 303 may be transmitted to the first prototype filter 304, and an optical component having the first wavelength $\lambda_1$ that matches the resonance curve of the first prototype filter 304 may be transmitted to the second waveguide 305. An optical signal transmitted to the second waveguide 305 may be input to the third port of the circulator 602, output from the first port of the circulator 602, and transmitted back to the light source 301. Through this process, an optical signal output from the light source 301 may be stabilized to the first wavelength $\lambda_1$.

Figure 7:
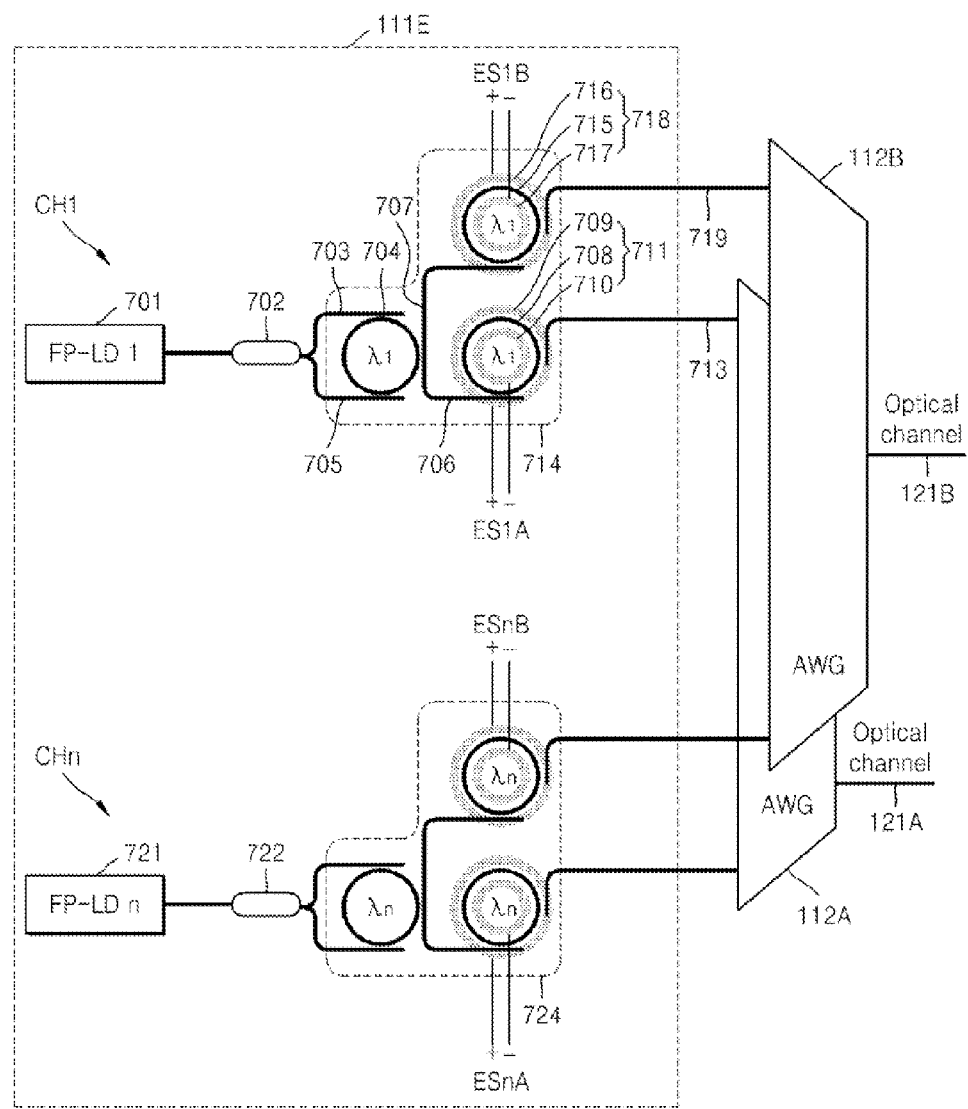
FIG. 7 is a block diagram illustrating an optical transmitter according to another embodiment of the inventive concept.

FIG. 7 is a block diagram illustrating an optical transmitter 111E according to another embodiment of the inventive concept.

Referring to FIG. 7, the optical transmitter 111E has at least two transmission data signal groups for modulating optical signals having the wavelengths $\lambda_1, \ldots,$ and $\lambda_n$, thereby expanding the number of channels. The optical transmitter 111E may transmit optical signals output from the plurality of channels CH1, . . . , and CHn to a first wavelength multiplexer 112A and a second wavelength multiplexer 112B. The optical transmitter 111E may transmit optical signals modulated by a first transmission data signal group ES1A, . . . , and ESnA to the first wavelength multiplexer 112A and transmit optical signals modulated by a second transmission data signal group ES1B, . . . , and ESnB to the second wavelength multiplexer 112B.

The optical transmitter 111E may include a plurality of light sources 701 and 721, a plurality of couplers 702 and 722, and a plurality of wavelength control units 714 and 724. The optical transmitter 111E may be connected to first and second optical channels 121A and 121B through the first and second wavelength multiplexers 112A and 112B each using an AWG.

The first channel CH1 may include the light source 701, the coupler 702, and the wavelength control unit 714. An FP-LD or a DFB-LD may be used as the light source 701. The coupler 702 may receive and distribute an optical signal output from the light source 701. Also, the coupler 702 may receive and output an optical component of an optical signal which is backscattered or reflected. The coupler 702 may be a bidirectional coupler. An optical signal propagating through the coupler 702 may be transmitted to the wavelength control unit 714.

The wavelength control unit 714 may modulate an optical signal transmitted through the coupler 702 according to a first transmission data signal ES1A of the first transmission data signal group ES1A, . . . , and ESnA. The wavelength control unit 714 may modulate an optical signal transmitted through the coupler 702 according to a first transmission data signal ES1B of the second transmission data signal group ES1B, . . . , and ESnB. The wavelength control unit 714 may include a first waveguide 703, a first prototype filter 704, a second waveguide 705, a third waveguide 706, a fourth waveguide 707, a first modulator 711, and a second modulator 718.

An optical signal input to the wavelength control unit 714 through the coupler 702 may be transmitted to the first and second waveguides 703 and 705. An optical signal transmitted to the first waveguide 703 may be transmitted to the first prototype filter 704. The first prototype filter 704 may have a resonance wavelength of, for example, the first wavelength $\lambda_1$. An optical component having the first wavelength $\lambda_1$ that matches a resonance curve of the first prototype filter 704 may be output from the first waveguide 703 to the second waveguide 705. An optical signal of first wavelength $\lambda_1$ output to the second waveguide 705 may be transmitted back to the light source 702 through the coupler 702. Through this process, an optical signal output from the light source 701 may be stabilized to the first wavelength $\lambda_1$.

An optical signal transmitted to the second waveguide 705 through the coupler 702 may be transmitted to the first prototype filter 704. An optical component having the first wavelength $\lambda_1$ that matches the resonance curve of the first prototype filter 704 may be output from the second waveguide 705 to the first waveguide 703. An optical signal of first wavelength $\lambda_1$ output to the first waveguide 703 may be transmitted back to the light source 701 through the coupler 702. Through this process, an optical signal output from the light source 701 may be further stabilized to the first wavelength $\lambda_1$.

An optical signal of first wavelength $\lambda_1$ output from the first prototype filter 704 may be transmitted to the third waveguide 706 and the fourth waveguide 707. An optical signal transmitted to the third waveguide 706 may be provided to the first modulator 711 to be optically modulated. The first modulator 711 may modulate an intensity of the optical signal according to the first transmission data signal ES1A of the first transmission data signal group ES1A, . . . , and ESnA. An optical signal transmitted to the fourth waveguide 707 may be provided to the second modulator 718 to be optically modulated. The second modulator 718 may modulate an intensity of the optical signal according to the first transmission data signal ES1B of the second transmission data signal group ES1B, . . . , and ESnB.

The first modulator 711 may include a second prototype filter 708, a first electrode 709, and a second electrode 710. The second prototype filter 708 may have a resonance wavelength of the first wavelength $\lambda_1$, like the first prototype filter 704. The first electrode 709 may be disposed on an outer circumferential surface of the second prototype filter 708, and the second electrode 710 may be disposed on an inner circumferential surface of the second prototype filter 708. The first transmission data signal ES1A is a binary signal that may be applied to the first electrode 709 and the second electrode 710.

The second prototype filter 708 may receive an optical signal transmitted to the third waveguide 706 and outputs an optical component having the first wavelength $\lambda_1$ that matches a resonance curve of the second prototype filter 708. An intensity of an optical signal of first wavelength $\lambda_1$ output from the second prototype filter 708 may be modulated by a voltage difference between the first and second electrodes 709 and 710 due to the first transmission data signal ES1A.

When a logic low first transmission data signal ES1A is applied to the first and second electrodes 709 and 710, an intensity of an optical signal output from the second prototype filter 708 is maximized. When a logic high first transmission data signal ES1A is applied to the first and second electrodes 709 and 710, an intensity of an optical signal output from the second prototype filter 708 is minimized.

The second modulator 718 may include a third prototype filter 715, a third electrode 716, and a fourth electrode 717. The third prototype filter 715 may have a resonance wavelength of the first wavelength $\lambda_1$, like the first prototype filter 704. The third electrode 716 may be disposed on an outer circumferential surface of the third prototype filter 715, and the fourth electrode 717 may be disposed on an inner circumferential surface of the third prototype filter 715. The first transmission data signal ES1B is a binary signal that may be applied to the third electrode 716 and the fourth electrode 717.

The third prototype filter 715 may receive an optical signal transmitted to the fourth waveguide 707 and output an optical component having the first wavelength $\lambda_1$ that matches a resonance curve of the third prototype filter 715. A wavelength of an optical signal of first wavelength $\lambda_1$ output from the third prototype filter 715 may be modulated by a voltage difference between the third and fourth electrodes 716 and 717 due to the first transmission data signal ES1B.

When a logic low first transmission data signal ES1B is applied to the third and fourth electrodes 716 and 717, an intensity of an optical signal output from the third prototype filter 715 is maximized. When a logic high first transmission data signal ES1B is applied to the third and fourth electrodes 716 and 717, an intensity of an optical signal output from the third prototype filter 715 is minimized.

An optical signal modulated according to the first transmission data signal ES1B of the second transmission data signal group ES1B, . . . , and ESnB and output from the third prototype filter 715 may be transmitted to the second wavelength multiplexer 112B through a sixth waveguide 719.

The first and second waveguides 703 and 705, the first prototype filter 704, the third and fourth waveguides 706 and 707, and the first and second modulators 711 and 718 may be thermally coupled to one another to maintain the same temperature. The refractive index of each of the first, second, third, and fourth waveguides 703, 705, 706 and 707 may vary due to an ambient temperature change. The first wavelength $\lambda_1$, the resonance wavelength of each of the first, second and third prototype filters 704, 711 and 718, may vary due to an ambient temperature change.

For stably resonated optical signals of first wavelength to be input to the first and second modulators 711 and 718, the thermally coupled first and second waveguides 703 and 705, first prototype filter 704, third and fourth waveguides 706 and 707, and first and second modulators 711 and 718 may be integrally formed as one wavelength control unit 714 on a semiconductor substrate. A material having a high thermal conductivity may be used in the wavelength control unit 714, or a trench that intercepts external heat may be formed in a boundary surface of the wavelength control unit 714 and filled with a material having a low thermal conductivity.

Like the first channel CH1, other channels of the optical transmitter 111E may each include a light source, a coupler, and a wavelength control unit. For example, the n$^{th}$ channel CHn may include an FP-LD light source 721, the coupler 722 that receives and distributes an optical signal output from the light source 721, and the wavelength control unit 724 that modulates an optical signal transmitted through the coupler 722 according to the n$^{th}$ transmission data signal ESn.

Prototype filters in the wavelength control unit 724 may have a resonance wavelength of, for example, the n$^{th}$ wavelength $\lambda_n$. The wavelength control unit 724 may include first and second modulators that receive an optical signal of n$^{th}$ wavelength $\lambda_n$ output from the light source 321. The first modulator may modulate an intensity of an optical signal according to an n$^{th}$ transmission data signal ESnA of the first transmission data signal group ES1A, . . . , and ESnA. The second modulator may modulate an intensity of an optical signal according to an n$^{th}$ transmission data signal ESnB of the second transmission data signal group ES1B, . . . , and ESnB.

An optical signal modulated according to the n$^{th}$ transmission data signal ESnA of the first transmission data signal group ES1A, . . . , and ESnA and output from the first modulator of wavelength control unit 724 may be transmitted to the first wavelength multiplexer 112A. An optical signal modulated according to the n$^{th}$ transmission data signal ESnB of the second transmission data signal group ES1B, . . . , and ESnB and output from the second modulator wavelength control unit 724 may be transmitted to the second wavelength multiplexer 112B.

The wavelength control unit 724 may be integrated onto a semiconductor substrate to maintain the same temperature for the waveguides and prototype filters in the wavelength control unit 724. A high thermal conductivity material may be used in the wavelength control unit 724, or a trench that intercepts external heat may be formed in a boundary surface of the wavelength control unit 724 and filled with a low thermal conductivity material.

In the first through $n^{th}$ channels CH1, . . . , and CHn, optical signals propagating through the first wavelength multiplexer 112A may be transmitted to the first optical channel 121A, and optical signals propagating through the second wavelength multiplexer 112B may be transmitted to the second optical channel 121B. The first transmission data signal group ES1A, . . . , and ESnA may be a band including the different wavelengths $\lambda_1$, . . . , and $\lambda_n$, and the second transmission data signal group ES1B, . . . , and ESnB may be a band including the different wavelengths $\lambda_1$, . . . , and $\lambda_n$. Accordingly, since the optical transmitter 111E includes the expanded optical channels 121A and 121B, the amount of data that may be transmitted may be increased.

Figure 8:
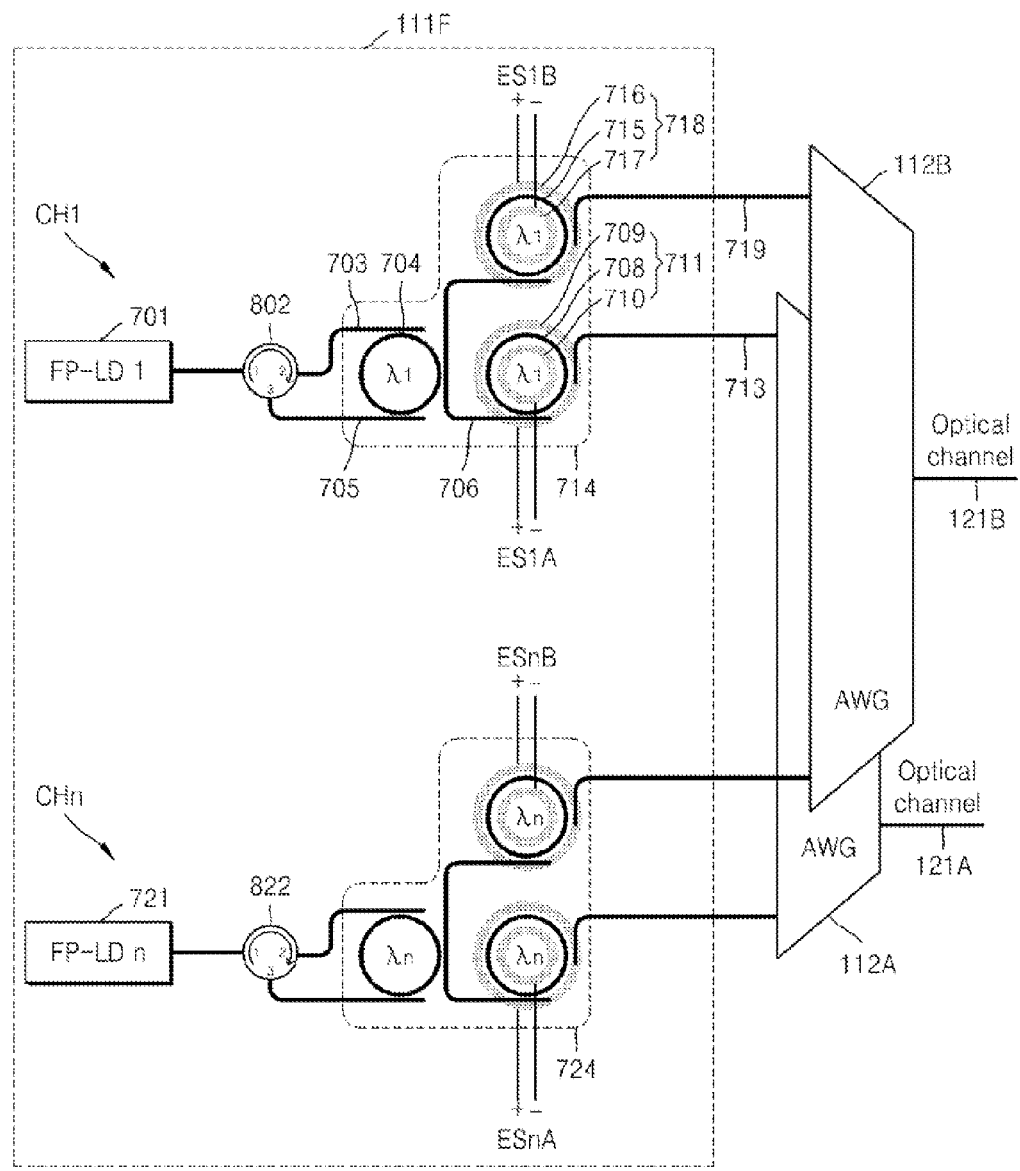
FIG. 8 is a block diagram illustrating an optical transmitter according to another embodiment of the inventive concept.

FIG. 8 is a block diagram illustrating an optical transmitter 111F according to another embodiment of the inventive concept.

Referring to FIG. 8, the optical transmitter 111F is similar to the optical transmitter 111E of FIG. 7, except that to stabilize wavelengths output from the light sources 701 and 702, the optical transmitter 111F uses circulators 802 and 822, instead of the couplers 702 and 722 of the optical transmitter 111E of FIG. 7. A detailed explanation of the elements of the optical transmitter 111F that are the same as corresponding elements in FIG. 7 will not be repeated.

An optical signal output from the light source 701 may be transmitted to the circulator 802. The circulator 802 is a passive nonreciprocal device including three or more ports. For example, if the circulator 802 includes three ports, the circulator 802 is configured such that light input to a first port is output from a second port, light input to the second port is output from a third port, and light input to the third port is output from the first port.

The circulator 802 may operate based on nonreciprocal phase shift or Faraday rotation. The circulator 802 may include center electrodes which intersect each other at a predetermined angle may on a ferrite sheet. A static magnetic field may be applied to the ferrite sheet, and a high frequency magnetic field may be generated by the center electrodes using ferromagnetic characteristics of the ferrite sheet Nonreciprocal characteristics are obtained by rotating a polarization plane of the high frequency magnetic field.

An optical signal output from the light source 701 may be input to the first port of the circulator 802, output from the second port of the circulator 802, and transmitted to the first waveguide 703. An optical signal transmitted to the first waveguide 703 may be transmitted to the first prototype filter 704, and an optical component having the first wavelength $\lambda_1$ that matches a resonance curve of the first prototype filter 804 may be output to the second waveguide 705. An optical signal transmitted to the second waveguide 805 may be input to the third port of the circulator 802, output from the first port of the circulator 802, and transmitted back to the light source 701. Through this process, an optical signal output from the light source 701 may be stabilized to the first wavelength $\lambda_1$.

Figure 9:
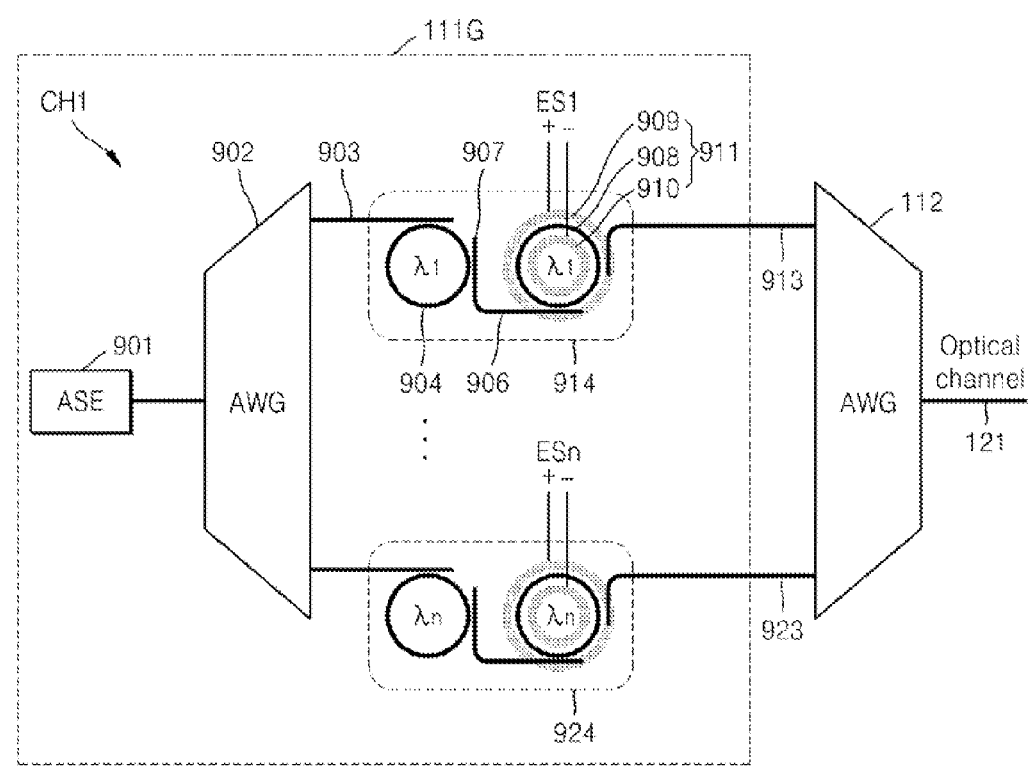
FIG. 9 is a block diagram illustrating an optical transmitter according to another embodiment of the inventive concept.

FIG. 9 is a block diagram illustrating an optical transmitter 111G according to another embodiment of the inventive concept.

Referring to FIG. 9, the optical transmitter 111G may receive an optical signal having a desired wavelength $\lambda$ using ASE, and modulate an intensity of the optical signal according to a transmission data signal. The optical transmitter 111G includes a light source 901, a wavelength demultiplexer 902, and a plurality of wavelength control units 914 and 924. The wavelength control units 914 and 924 may be called modulators 914 and 924. The optical transmitter 111G may be connected to the optical channel 121 through the wavelength multiplexer 112 using an AWG.

ASE may be used as the light source 901. ASE may have a relatively wide wavelength band, as shown in FIG. 4. Since ASE is used as the light source 901, manufacturing costs of the optical transmitter 111G may be reduced and a process of stabilizing the light source 901 may be not required.

The wavelength demultiplexer 902 may use an AWG. The wavelength demultiplexer 902 may receive an optical signal from the light source 901 and divide the optical signal according to the wavelengths $\lambda_1$, . . . , and $\lambda_n$. Optical signals passing through the wavelength demultiplexer 902 may be distributed to the plurality of channels CH1, . . . , and CHn. That is, the first channel CH1 selects an optical signal of the first wavelength $\lambda_1$ and combines the optical signal of the first wavelength $\lambda_1$ with the first transmission data signal ES1, and the $n^{th}$ channel CHn selects an optical signal of the $n^{th}$ wavelength $\lambda_n$ and combines the optical signal of the $n^{th}$ wavelength $\lambda_n$ with the $n^{th}$ transmission data signal ESn.

The wavelength control unit 914 of the first channel CH1 may modulate an intensity of an optical signal transmitted through the wavelength demultiplexer 902 according to the first transmission data signal ES1. The wavelength control unit 914 may include a first waveguide 903, a first prototype filter 904, a second waveguide 906, a third waveguide 907, and a modulator 911. An optical signal input to the wavelength control unit 914 may be transmitted through the first waveguide 903. An optical signal transmitted through the first waveguide 903 may be transmitted to the first prototype filter 904. The first prototype filter 904 may have a resonance wavelength of, for example, the first wavelength $\lambda_1$. An optical component having the first wavelength $\lambda_1$ that matches a resonance curve of the first prototype filter 904 may be output to the second waveguide 906.

An optical signal of the first wavelength $\lambda_1$ output from the first prototype filter 904 may be transmitted to the second waveguide 906 and the third waveguide 907. An optical signal transmitted to the second waveguide 906 may be provided to the modulator 911 to be optically modulated. The modulator 911 may modulate an intensity of the optical signal according to the first transmission data signal ES1, which is an electrical signal.

An optical signal transmitted to the third waveguide 907 may be used to monitor a power state of the light source 901. In detail, when the power of the optical signal transmitted to the fourth waveguide 907 is lower than an upper limit, the power of the light source 901 may be increased, and when the power of the optical signal transmitted to the third waveguide 907 is higher than the upper limit, the power of the light source 901 may be reduced. The power of the light source 901 may be monitored without interrupting its transmission.

The modulator 911 may include a second prototype filter 908, a first electrode 909, and a second electrode 910. The second prototype filter 908 may have a resonance wavelength of the first wavelength $\lambda_1$, like the first prototype filter 904. The first electrode 909 may be disposed on an outer circumferential surface of the second prototype filter 908, and the second electrode 910 may be disposed on an inner circumferential surface of the second prototype filter 908. The first transmission data signal ES1 is a binary signal that may be applied to the first electrode 909 and the second electrode 910.

The second prototype filter 908 may receive an optical signal transmitted through the second waveguide 906 and outputs an optical component having the first wavelength $\lambda_1$ that matches a resonance curve of the second prototype filter 908. An intensity of an optical signal of the first wavelength $\lambda_1$ output from the second prototype filter 908 may be modulated by to a voltage difference between the first and second electrodes 909 and 910 due to the first transmission data signal ES1. When the first transmission data signal ES1 is logic low with no voltage difference between the first and second electrodes 909 and 910, an intensity of an optical signal output from the second prototype filter 908 is maximized. When the first transmission data signal ES1 is logic high with a predetermined voltage difference between the first and second electrodes 909 and 910, an intensity of an optical signal output from the second prototype filter 908 is minimized.

An optical signal modulated according to the first transmission data signal ES1 and output from the second prototype filter 908 may be transmitted to the wavelength multiplexer 112 through a fourth waveguide 913.

The first waveguide 903, the first prototype filter 904, the second and third waveguides 906 and 907, and the modulator 911 may be thermally coupled to one another to maintain the same temperature. A refractive index of each of the first, second and third waveguides 903, 906 and 907 may vary due to an ambient temperature change. The first wavelength $\lambda_1$, the resonance wavelength of the first and second prototype filters 904 and 908, may vary due to an ambient temperature change.

To input a stably resonated optical signal of first wavelength $\lambda_1$ to the modulator 911, the thermally coupled first waveguide 903, the first prototype filter 904, the second and third waveguides 906 and 907, and the modulator 911 may be integrally formed as one wavelength control unit 914 on a semiconductor substrate. A high thermal conductivity material may be used in the wavelength control unit 914, or a trench that intercepts external heat may be formed in a boundary surface of the wavelength control unit 914 and be filled with a low thermal conductivity material.

Like the first channel CH1, other channels of the optical transmitter 111G may each include a wavelength control unit. For example, in the $n^{th}$ channel CHn, the wavelength control unit 924 may modulate an optical signal having the $n^{th}$ wavelength $\lambda_n$ obtained by the wavelength demultiplexer 902 according to the $n^{th}$ transmission data signal ESn. Prototype filters in the wavelength control unit 924 may have a resonance wavelength of, for example, the $n^{th}$ wavelength $\lambda_n$.

The wavelength control unit 924 may receive an optical signal of the $n^{th}$ wavelength $\lambda_n$ from the wavelength demultiplexer 902 and modulate the optical signal according to the $n^{th}$ transmission data signal ESn. An optical signal modulated according to the $n^{th}$ transmission data signal ESn and output from the wavelength control unit 924 may be transmitted to the wavelength multiplexer 112 through a waveguide 923.

The wavelength control unit 924 may be integrally formed on a semiconductor substrate to maintain the same temperature for the waveguides and prototype filters in the wavelength control unit 924. A high thermal conductivity material may be used in the wavelength control unit 924, or a trench that intercepts external heat may be formed in a boundary surface of the wavelength control unit 924 and be filled with a low thermal conductivity material.

While embodiments of the inventive concept has been particularly shown and described with reference to exemplary embodiments thereof using specific terms, the embodiments and terms used herein should not be construed as limiting the scope of embodiments of the inventive concept defined by the claims. Accordingly, it will be understood by those of ordinary skill in the art that various changes in form and details may be made therein without departing from the spirit and scope of the inventive concept as defined by the following claims.

What is claimed is:

1. An optical transmitter comprising:
   a light source that outputs optical signals having a plurality of wavelengths; and
   a wavelength control unit that receives an optical signal from the light source, resonates an optical signal of the optical signals having a first wavelength, modulates the optical signal of the first wavelength with a first transmission data signal to obtain an intensity-modulated optical signal, and outputs the intensity-modulated optical signal,
   wherein the wavelength control unit is integrally formed on a semiconductor substrate in which a high thermal conductivity material is used.

2. The optical transmitter of claim 1, further comprising a coupler connected between the light source and the wavelength control unit that stabilizes an optical signal output from the light source to the first wavelength.

3. The optical transmitter of claim 2, wherein the wavelength control unit comprises:
   a first waveguide through which the optical signals received from the coupler is transmitted;
   a first prototype filter that resonates the optical signal received from the first waveguide to the first wavelength;
   a second waveguide that transmits the optical signal of the first wavelength from the first prototype filter to the light source through the coupler;
   third and fourth waveguides through which the optical signal of the first wavelength received from the first prototype filter is transmitted; and
   a first modulator that receives an optical signal from the third waveguide and modulates an intensity of the optical signal according to the first transmission data signal.

4. The optical transmitter of claim 3, wherein the wavelength control unit monitors a power state of the light source using an optical signal transmitted to the fourth waveguide.

5. The optical transmitter of claim 3, wherein the wavelength control unit further comprises a second modulator that receives an optical signal from the third waveguide and modulates a wavelength of the optical signal according to a second transmission data signal.

6. The optical transmitter of claim 1, further comprising a circulator connected between the light source and the wavelength control unit that stabilizes an optical signal received from the light source to the first wavelength, said circulator including a plurality of ports.

7. The optical transmitter of claim 6, wherein the wavelength control unit comprises:
   a first waveguide that transmits an optical signal received at a first port of the circulator from a second port of the circulator;
   a first prototype filter that resonates an optical signal received from the first waveguide to the first wavelength;

a second waveguide that transmits an optical signal of the first wavelength received from the first prototype filter to a third port of the circulator;

third and fourth waveguides that transmit an optical signal of the first wavelength received from the first prototype filter; and a first modulator that receives an optical signal transmitted through the third waveguide and modulates a wavelength of the optical signal according to the first transmission data signal, wherein the circulator transmits from the first port of the circulator to the light source the optical signal received from the third port of the circulator.

8. The optical transmitter of claim 7, wherein the wavelength control unit monitors a power state of the light source using an optical signal transmitted to the fourth waveguide.

9. The optical transmitter of claim 7, wherein the wavelength control unit comprises a second modulator that receives an optical signal from the third waveguide and modulates a wavelength of the optical signal according to a second transmission data signal.

10. The optical transmitter of claim 1, wherein the light source is a distributed feedback laser diode (DFB-LD) or a Fabry Perot laser diode (FP-LD).

11. The optical transmitter of claim 1, wherein the light source uses amplified spontaneous emission (ASE), and the optical transmitter further comprises a wavelength demultiplexer connected between the light source and the wavelength control unit that divides an optical signal received from the light source according to wavelengths.

12. The optical transmitter of claim 11, wherein the wavelength control unit comprises:

a first waveguide through which an optical signal received from the wavelength demultiplexer is transmitted;

a first prototype filter that resonates an optical signal received from the first waveguide to the first wavelength and transmits the optical signal to a second waveguide;

second and third waveguides through which an optical signal of the first wavelength received from the first prototype filter is transmitted; and a first modulator that receives an optical signal from the second waveguide and modulates an intensity of the optical signal according to the first transmission data signal.

13. The optical transmitter of claim 1, wherein the wavelength control unit further comprises a trench that intercepts external heat formed in a boundary surface thereof, said trench being filled with a low thermal conductivity material.

14. An optical communication system comprising:

a plurality of optical transmitters that transmit optical data signals having different wavelengths;

a wavelength multiplexer that transmits to an optical channel a wavelength-multiplexed optical signal formed from the optical data signals received from each of the plurality of optical transmitters;

a wavelength demultiplexer that receives the wavelength-multiplexed optical signal from the optical channel and divides the wavelength-multiplexed optical signal according to wavelengths to obtain wavelength-divided optical signals; and an optical receiver that converts the wavelength-divided optical signals received from the wavelength demultiplexer into electrical data signals, wherein each of the plurality of optical transmitters comprises:

a light source that outputs optical signals having a plurality of wavelengths; and a wavelength control unit that receives an optical signal from the light source, resonates an optical signal of the optical signals having a first wavelength, modulates the optical signal of the first wavelength with a first transmission data signal to obtain an intensity-modulated optical signal, and outputs the intensity-modulated optical signal, wherein the wavelength control unit is integrally formed on a semiconductor substrate in which a high thermal conductivity material is used.

15. The optical communication system of claim 14, wherein the wavelength control unit further comprises a trench that intercepts external heat formed in a boundary surface thereof and filled with a low thermal conductivity material.

16. An optical transmitter comprising:

a light source that outputs optical signals having a plurality of wavelengths;

a wavelength control unit that includes a prototype filter that resonates with a first wavelength to transmit an optical signal having a first wavelength from the optical signals, a first electrode disposed on an outer circumference surface of the prototype filter, a second electrode disposed on an inner circumference surface of the prototype filter, said first and second electrodes adapted to receive a first transmission data signal that modulates an intensity of the optical signal of the first wavelength, wherein the wavelength control unit is integrally formed on a semiconductor substrate; and a trench that intercepts external heat formed in a boundary surface of wavelength control unit that is filled with a low thermal conductivity material.

17. The optical transmitter of claim 16, further comprising a coupler connected between the light source and the wavelength control unit that stabilizes an optical signal output from the light source to the first wavelength, wherein the wavelength control unit comprises:

a first waveguide through which the optical signals received from the coupler is transmitted;

a second prototype filter that resonates the optical signal of the optical signals to the first wavelength;

a second waveguide that transmits the optical signal of the first wavelength from the second prototype filter to the light source through the coupler; and third and fourth waveguides through which the optical signal of the first wavelength received from the first prototype filter is transmitted to the first prototype filter.

18. The optical transmitter of claim 16, further comprising a circulator connected between the light source and the wavelength control unit that stabilizes an optical signal received from the light source to the first wavelength, said circulator including a plurality of ports, wherein the wavelength control unit comprises:

a first waveguide that transmits an optical signal received at a first port of the circulator from a second port of the circulator;

a second prototype filter that resonates an optical signal received from the first waveguide to the first wavelength;

a second waveguide that transmits an optical signal of the first wavelength received from the second prototype filter to a third port of the circulator; and third and fourth waveguides that transmit an optical signal of the first wavelength received from the second prototype filter to the first prototype filter, wherein the circulator transmits from the first port of the circulator to the light source the optical signal received from the third port of the circular.

19. The optical transmitter of claim 16, wherein the light source uses amplified spontaneous emission (ASE), and the optical transmitter further comprises a wavelength demultiplexer connected between the light source and the wavelength control unit that divides an optical signal received from the light source according to wavelengths, wherein the wavelength control unit further comprises:
- a first waveguide through which an optical signal received from the wavelength demultiplexer is transmitted;
- a second prototype filter that resonates an optical signal received from the first waveguide to the first wavelength and transmits the optical signal to a second waveguide; and
- second and third waveguides through which an optical signal of the first wavelength received from the second prototype filter is transmitted to the first prototype filter.

20. The optical transmitter of claim 16, wherein the wavelength control unit further comprises:
- a second prototype filter that resonates an optical signal received from the light sources to the first wavelength;
- a second waveguide that transmits the optical signal of the first wavelength received from the second prototype filter to the first prototype filter;
- a third wave guide that receives the optical signal of the first wavelength from the second prototype filter; and
- a modulator that receives the optical signal from the third waveguide and modulates a wavelength of the optical signal according to a second transmission data signal.

* * * * *